US012806091B2

(12) United States Patent
Klein

(10) Patent No.: US 12,806,091 B2
(45) Date of Patent: Nov. 24, 2026

(54) FOLDING ELECTRIC WHEELCHAIR WITH ELEVATING SEAT

(71) Applicant: Michele Marie Klein, Spicewood, TX (US)

(72) Inventor: Michele Marie Klein, Spicewood, TX (US)

( * ) Notice: Subject to any disclaimer, the term of this patent is extended or adjusted under 35 U.S.C. 154(b) by 117 days.

(21) Appl. No.: 17/478,194

(22) Filed: Sep. 17, 2021

(65) Prior Publication Data

US 2022/0000688 A1 Jan. 6, 2022

Related U.S. Application Data

(63) Continuation-in-part of application No. 16/743,229, filed on Jan. 15, 2020.

(51) Int. Cl.

| | |
|---|---|
| ***A61G 5/08*** | (2006.01) |
| ***A61G 5/04*** | (2013.01) |
| ***A61G 5/06*** | (2006.01) |
| ***A61G 5/10*** | (2006.01) |
| ***A61G 5/12*** | (2006.01) |

(52) U.S. Cl.

CPC ............ *A61G 5/0841* (2016.11); *A61G 5/045* (2013.01); *A61G 5/06* (2013.01); *A61G 5/0866* (2016.11); *A61G 5/0891* (2016.11); *A61G 5/1045* (2016.11); *A61G 5/1048* (2016.11); *A61G 5/1078* (2016.11); *A61G 5/1091* (2016.11); *A61G 5/125* (2016.11); *A61G 5/128* (2016.11); *A61G 2203/14* (2013.01)

(58) Field of Classification Search

CPC ........ A61G 5/0841; A61G 5/045; A61G 5/06; A61G 5/0866; A61G 5/0891; A61G 5/1045; A61G 5/1048; A61G 5/1078; A61G 5/1091; A61G 5/125; A61G 5/128; A61G 2203/14; A61G 5/0858; A61G 5/0833; B60K 1/04; B60K 2001/0422; B60K 2001/0494; B60K 2026/029; B60K 26/02; B60Y 2200/84

USPC ....................................................... 280/250.1

See application file for complete search history.

(56) References Cited

U.S. PATENT DOCUMENTS

| | | | | |
|---|---|---|---|---|
| 2001/0002081 A1* | 5/2001 | Toppses | A61G 5/1059 | 280/250.1 |
| 2007/0067905 A1* | 3/2007 | Wilder | A61G 7/1011 | 5/83.1 |
| 2016/0270988 A1* | 9/2016 | Diaz-Flores | A61G 5/1024 | |

FOREIGN PATENT DOCUMENTS

| | | | |
|---|---|---|---|
| EP | 0960614 A2 * | 12/1999 | A61G 5/125 |

* cited by examiner

*Primary Examiner* — Kevin Hurley
*Assistant Examiner* — Felicia L. Brittman-Alabi
(74) *Attorney, Agent, or Firm* — Thompson Patent Law Offices PC

(57) ABSTRACT

A folding electric wheelchair with elevating seat that provides the user an electronic driving system powered by two lithium-ion batteries that is sealed to be weatherproof, able to drive over different terrain types and slope grades on any given day whether it's raining or sunny, lightweight, and portable for transportation, travel-friendly, compact in overall size when in the folded position to fit into a small space for storage. An ergonomically contoured seat with an actuator that can raise and lower the seat base overall height. A bump dampening and terrain vibration system with the supporting frame pieces (34), (42), and (50) having an oval shape. The manner of how the embodiment operates to fold and unfold consists of specific hinge joint embodiments including: (46), (48), (58) and (64).

6 Claims, 8 Drawing Sheets

FOLDING ELECTRIC WHEELCHAIR WITH ELEVATING SEAT

This is a continuation-in-part of application Publication No. US-2021-0212871-A1, application Ser. No. 16/743,229 filed, with title "FOLDING ELECTRIC WHEELCHAIR" and naming Michele M. Klein as inventor the entire content of which is hereby incorporated herein by reference.

TECHNICAL FIELD

The present invention relates to a folding electric wheelchair with elevating seat, and especially to a folding electric wheelchair with elevating seat that is lightweight and portable for transportation, travel friendly, with an electronic driving system that is sealed to be weatherproof, while able to drive over many different types of terrain and slope grades with a bump-dampening and terrain vibration system, which includes an ergonomically contoured seat with an actuator that can raise and lower the seat in overall height to fit people with a smaller body frame and stature.

BACKGROUND OF THE EMBODIMENT

The electric wheelchair is known in prior art to transport people with a physical disability. Traditional electric wheelchairs use electric motors and batteries which tend to be very heavy and not portable. These types of electric wheelchairs are so heavy, weighing on average around 300 lbs. that trying to transport the wheelchair requires additional equipment: a handicapped van, hauling trailer, hydraulic lift, or the user must pay for medical transportation.

This type of heavy electric wheelchair is also not allowed on airplanes by the FAA, and many public transportation buses do not have ramps to allow these kinds of large wheelchairs to drive into the bus. If any wheelchair is on a bus, the frame must be made of a strong material so the chair can be strapped or hooked to the floorboard of the bus. That way, if the bus stops suddenly the wheelchair is immovable and won't get thrown towards the front of the bus. Subways are just as difficult to navigate with a heavy electric wheelchair. Subway stations are underground and usually have a staircase to walk down to the platform itself. Some subway stations might have elevators, but these elevators are not always in working condition. For a person with physical disabilities needing to use an electric wheelchair to get around, leaving your home can be extremely difficult. Especially if that person does not have any assistance from a healthy able-bodied person or caregiver.

Another obstacle when using an electric wheelchair is weather. These types of heavy wheelchairs have electrical components that cannot get wet. If they do get wet, they will short circuit and stop operating leaving the disabled person stranded. Weather can also be a factor when a person schedules a doctor's appointment at a future date, since it is difficult to determine what the weather will be like on that day. There will be days that start out with a beautiful sunny day, and end with rain. Unfortunately, after the rain stops, the concrete and asphalt are now wet or even flooded with water, and this can leave people stranded in their heavy electric wheelchair.

Another obstacle when using a heavy electric wheelchair is terrain. The ADA sets guidelines to ensure public areas are built to handle wheelchairs, unfortunately not all areas follow those guidelines. For example, a handicap ramp must not be steeper than a 12-degree slope, concrete sidewalks must be 3 feet wide, and ramps must be available to transition over a curb from a parking lot to a sidewalk. Sadly, not everywhere a disabled person goes is handicap accessible. Sidewalks end and many slopes like parking garages, crosswalks, gangways to airplanes or cruise ships are steeper than a 12-degree slope. Rocks, dirt, grass, gravel are all types of terrain that are obstacles for heavy electric wheelchairs. These types of heavy electric wheelchairs have small smooth tread wheels with very low ground clearance, which limits its driving to only flat smooth surfaces like concrete and asphalt.

Comfortable seating is the final obstacle when using an electric wheelchair. Traditional seat cushions on electric wheelchairs are flat pieces of foam. This prior design shape is not comfortable to sit on all day long. This seat cushion designs begins to dig into the back of the legs, causing pain, stiffness, and circulation problems. When a disabled person uses an electric wheelchair, the user is in a seated position for extended periods of time without the ability to stand up and stretch their legs. A comfortable ride does not stop with the seat design. Since the seat is attached to the frame of the wheelchair the user can feel each and every bump that the wheelchair drives over. These bumps or terrain vibrations filter up through the frame construction and seat design to the disabled user. Wheelchairs do not have shocks, or independent suspension like automobiles, so the supporting frame shape and construction handle the bump-dampening and terrain vibration system.

A different type of electric wheelchair is needed for people with physical disabilities. These people need increased mobility, independence from caregivers or other medical transportation devices, and freedom to travel outside of their home. This electric wheelchair design must be lightweight enough to lift without assistance, and portable enough to fit inside a very small storage space. It must also have weatherproof capabilities to drive in the rain, snow, mud, and puddles. The wheels must be oversized, off-road wheels with aggressive tread to drive over rocks, dirt, gravel, and grass. This same electric wheelchair must be able to also climb surfaces steeper than most 12-degree ramps, by positioning the person safely within its structure. Lastly, the seat, must be ergonomically contoured to provide the person with all day comfort.

At the age of 26, I was diagnosed with rheumatoid arthritis. By the time I was in my late 30s the disease had crippled me to the point that I could no longer stand or walk, and I was forced to be permanently confined to a wheelchair. I had no choice but to rely on caregivers to help me meet my most basic needs: eating, drinking, bathing, dressing, and even going to the bathroom.

I was shocked that there were so few choices when it came to mobility devices. Since my Rheumatoid Arthritis fingers were crippled, I could not push the wheels of the manual chair, so I needed the wheelchair to be electric! I started working on designing a folding electric wheelchair for myself. I wanted a wheelchair that would fold up similar to a traditional manual wheelchair and fit in the back of any size vehicle.

I also wanted an electric wheelchair that could be driven in any type of weather. Since I was disabled every single day, I did not want to be limited to only be able to go outside my home, or going to my doctor's appointments, when it was sunny outside.

I enjoy traveling, going on cruises, and flying to other parts of the world to experience different cultures. Just because I had limitations in walking, I wanted a chair to help me "Keep Going". I was all too familiar with using the manual push wheelchairs at the airport. I had experienced missing connecting flights on numerous occasions because the airport wheelchair attendant did not feel like "rushing" me to the next gate.

SUMMARY OF THE EMBODIMENTS

A folding electric wheelchair includes 15 individual frame pieces connected with different sized bolts and nuts, two front caster wheels attached to the frame that allows the chair to steer in any direction, and a pair of weatherproof electric motors with an all-terrain aggressive oversized rear wheel are attached to the end of each battery sleeve. The power for the electric wheelchair comes from two lithium-ion batteries which slide inside each hollow frame battery sleeve on the right and left sides under the seat base frame. The footrest includes a padded grip plate to hold the user's feet on the footrest while operating the chair. The main supporting frame pieces are fabricated out of an oval shaped tubing material to enhance bump-dampening or terrain vibrations while driving over rough terrain, i.e. cobblestones, pavers, bricks, curbs, gravel, and rocks.

The ergonomically contoured seat base frame and backrest frame also attach the sculpted seat and backrest cushions which provide comfortable seating for all day use. This model also includes an actuator that allows the seat base to raise and lower in overall height, so smaller sized adults or children can adjust the seat height to fit their exact needs.

The wheelchair has two curved armrests that are attached to the contoured backrest frame on each side of the seat, that can pivot up to be flush with the backrest frame. This allows the user to transfer in and out of the chair. These same armrests will also pivot up when the entire unit is in the folded position for either storage or travel.

A weatherproof joystick controller slides into either the right or left armrest to help steer and drive the wheelchair. The joystick is held into the armrest by a metal base and thumbscrew which can be loosened and or tightened with the user's fingers and requires no special tools. This allows for easy removal of the joystick whenever needed.

A small weatherproof computer known as the CPU connects all electronics and operates all drive functions of the wheelchair.

Advantages

The advantages of this wheelchair are as follows: to provide the user an electronic driving system that is sealed and weatherproof, that can drive over different terrain types and slope grades on any given day whether it's raining or sunny, which also includes an ergonomically contoured seat and an actuator that can raise and lower the overall height of the seat base, while also being lightweight and portable for transportation, travel-friendly, compact in overall size when in the folded position which allows it to fit into a small space for storage. Other advantages of one or more aspects will be apparent from a consideration of the drawings and ensuing descriptions.

DRAWINGS-REFERENCE NUMERALS

| | | | |
|---|---|---|---|
| 10 | Battery Sleeve Housing | 12 | Rear Motor Off-Road Wheel |
| 14 | Front Caster Off-Road Wheel | 16 | Footrest |
| 18 | Footrest Grip Plate | 20 | Front Caster Wheel Fork |
| 22 | Right Front Caster Swivel Housing | 24 | Left Front Caster Swivel Housing |
| 26 | Right Leg Strap Support Frame | 28 | Left Leg Strap Support Frame |
| 34 | Seat Base Support Frame | 36 | Seat Cushion |
| 42 | Armrest | 44 | Joystick Controller |
| 46 | Right Armrest Folding Hinge Joint | 48 | Left Armrest Folding Hinge Joint |
| 50 | Backrest Support Frame | 52 | Backrest Cushion |
| 54 | Left Frame Lock Lever | 56 | Right Frame Lock Lever |
| 58 | Rear Frame Folding Hinge Joint | 60 | Under Carriage Support Frame |
| 62 | CPU Computer | 64 | Footrest Folding Hinge Joint |
| 66 | Lithium-ion Battery | 68 | Right Side Rear Motor |
| 70 | Left Side Rear Motor | 72 | Elevating Seat Actuator |

DETAILED DESCRIPTION OF SPECIFIC EMBODIMENTS

Figure 1:
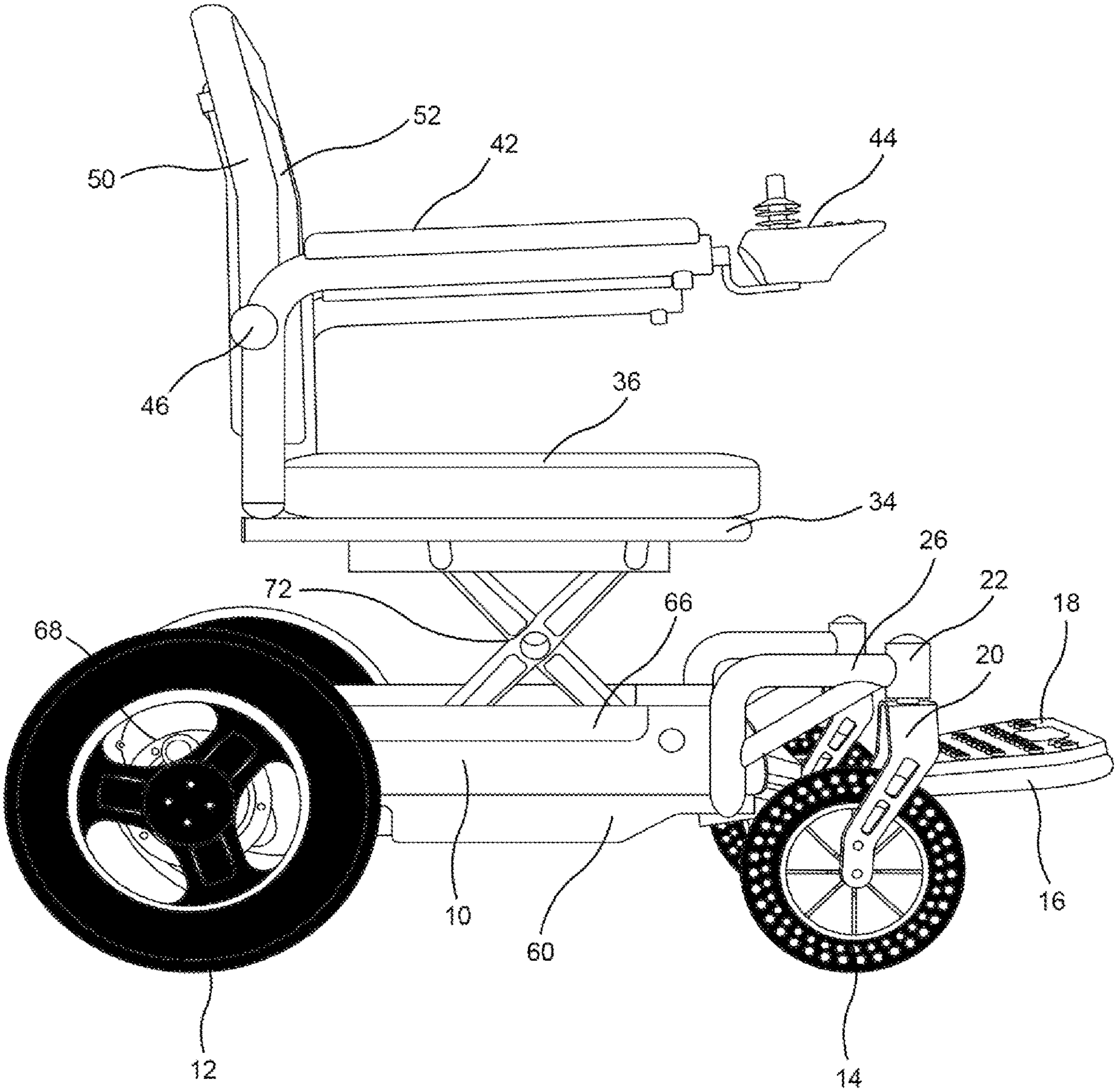
FIG. 1 shows the right side view of the folding electric wheelchair with elevating seat and schematically illustrates the wheelchair in the unfolded operational drive position.

Referring now to FIG. 1 (right side unfolded view) of the folding electric wheelchair with elevating seat. The power for the embodiment is supplied by 66 which slides into and is contained by 10. The top end of 10 has a hollow opening which 66 slides into, the bottom end has four bolts, two located on the top side and two located on the bottom side which screws into 68. At the bottom end of 10 holds the positive and negative battery plugs that connect 66 to 68 for electrical power to move the embodiment. When 66 is encased inside 10 this seals 66 from outside weather elements, thus making 66 weatherproof. The 10 interlocks with 26 and 60 where both specific embodiments overlay each other to provide a hinge joint that allows the wheelchair to fold up.

The user of the folding electric wheelchair with elevating seat sits on 36 which is bolted onto 34 by four screws into the two crossbeam supports of 34. The crossbeams are made out of a rounded tube and are welded to the oval tube shape of 34. The material of 34 can consist of other types of tubular material, and the tube has an oval shape. Having the tubular material be an oval shape provides the bump-dampening and terrain vibration system for the folding electric wheelchair.

The oval shaped specific embodiment is 50. The material of 50 can consist of other types of tubular material, and the tube has an oval shape. Having the tubular material be an oval shape provides the bump-dampening and terrain vibration system for the folding electric wheelchair with elevating seat. The end of 42 connects to 50 using 46, this allows 42 to be raised or pushed up out of the way so the user can transfer in and out of the embodiment. This specific embodiment of 46 also allows the wheelchair to fold up.

Figure 2:
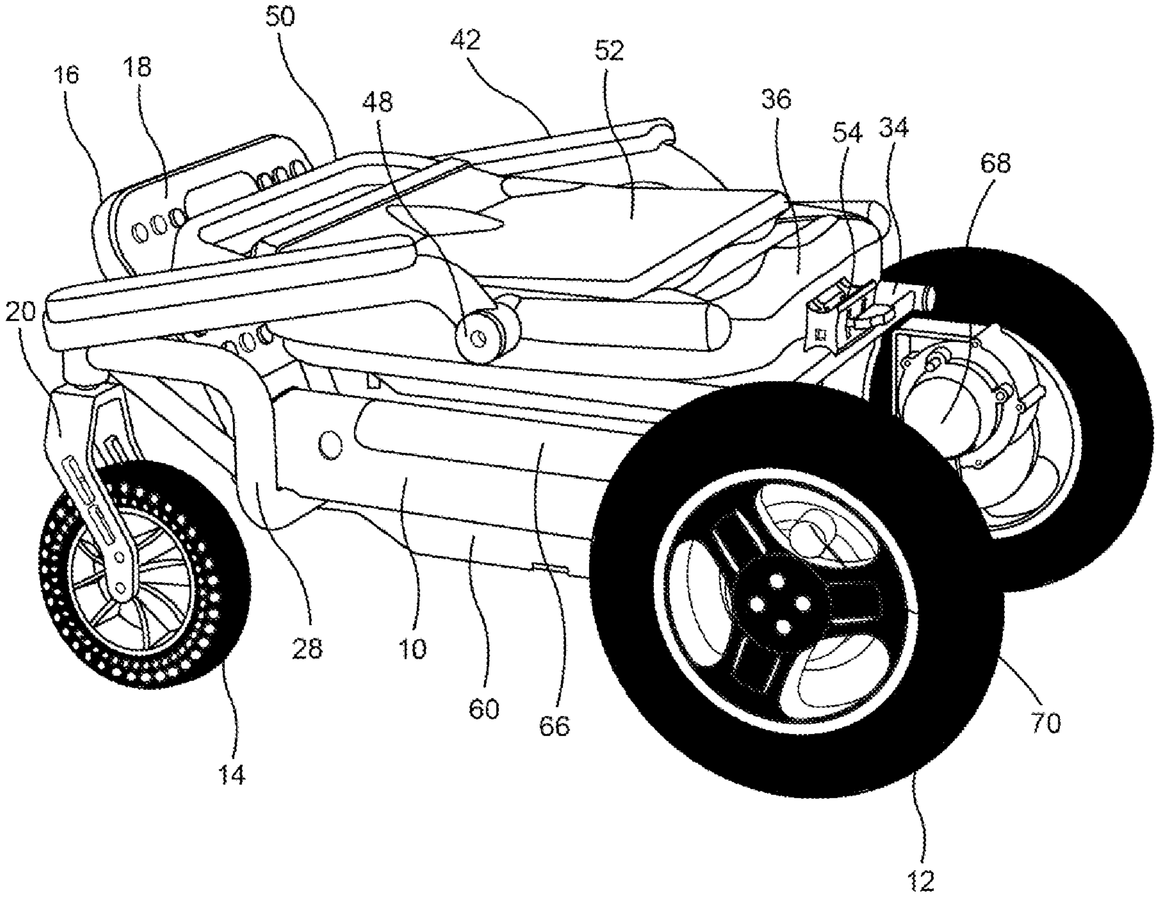
FIG. 2 shows the left side view of the folding electric wheelchair with elevating seat and schematically illustrates the wheelchair in the folded or collapsed position for either storage or travel friendly position.

Referring now to FIG. 2 (left side folded view) of the folding electric wheelchair with elevating seat. When the embodiment is in the folded position 50 and 34 are parallel to each other, with 52 and 36 touching against each other. The 16 folds up to sit on top of the ergonomic contour of 36. This specific embodiment of 16 allows the wheelchair to fold up. The 42 is raised or pushed up toward 50 to rest alongside 50. The folding electric wheelchair with elevating seat can lay flat by itself in the folded position because the embodiment sits on the ground and is supported by 12 and 14. These pair of contact points on the ground assist the folding electric wheelchair with elevating seat to lay flat without any additional equipment. This provides the user with freedom and independence while traveling.

Figure 3:
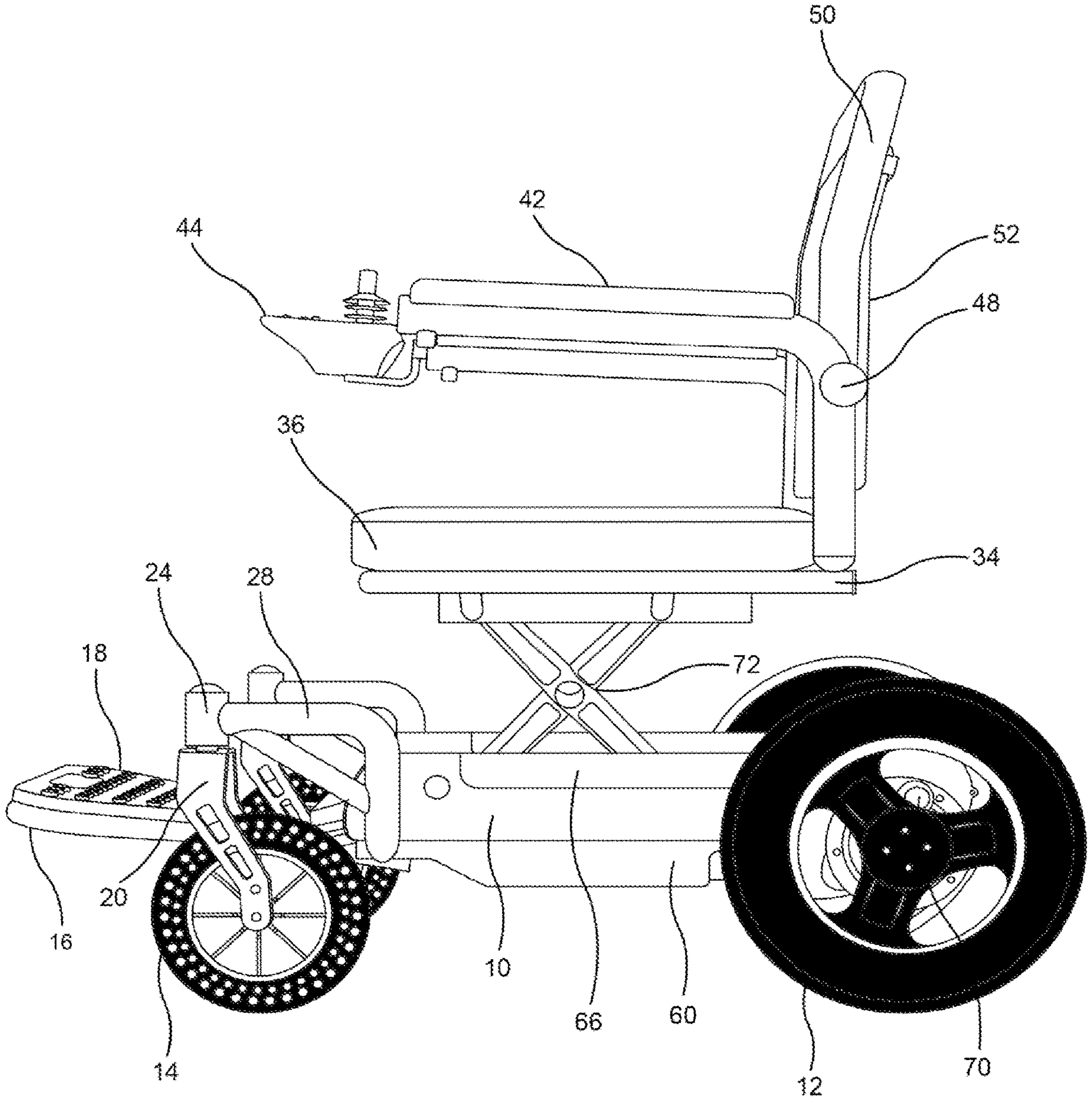
FIG. 3 shows the left side view of the folding electric wheelchair with elevating seat and schematically illustrates the wheelchair in the unfolded operational drive position.

Referring now to FIG. 3 (left side unfolded view) of the folding electric wheelchair with elevating seat. The power for the embodiment is supplied by 66 which slides into and is contained by 10. The top end of 10 has a hollow opening, the bottom end has four bolts, two located on the top side and two located on the bottom side which screws into 70. At the bottom end of 10 holds the positive and negative battery plugs that connect 66 to 70 for electrical power to move the embodiment. When 66 is encased inside 10 this seals 66 from outside weather elements, thus making 66 weatherproof. The 10 interlocks 28 and 60 both specific embodiments overlay each other to provide a hinge joint that allows the wheelchair to fold up.

The user of the folding electric wheelchair with elevating seat sits on 36 which is bolted onto 34 by four screws into the two crossbeam supports of 34. The crossbeams are made of a rounded tube and are welded to the oval tube shape of 34. The material of 34 can consist of other types of tubular material, and the tube has an oval shape. Having the tubular material be an oval shape provides the bump-dampening and terrain vibration system for the folding electric wheelchair.

The oval shaped specific embodiment is 50. The material of 50 can consist of other types of tubular material, and the tube has an oval shape. Having the tubular material be an oval shape provides the bump-dampening and terrain vibration system for the folding electric wheelchair with elevating seat. This support frame piece holds two folding hinge joints of 46 and 48. The end of 42 connects to 50 using 48, this allows 42 to be raised or pushed up out of the way so the user can transfer in and out of the embodiment. This specific embodiment of 48 allows the wheelchair to fold up.

Figure 4:
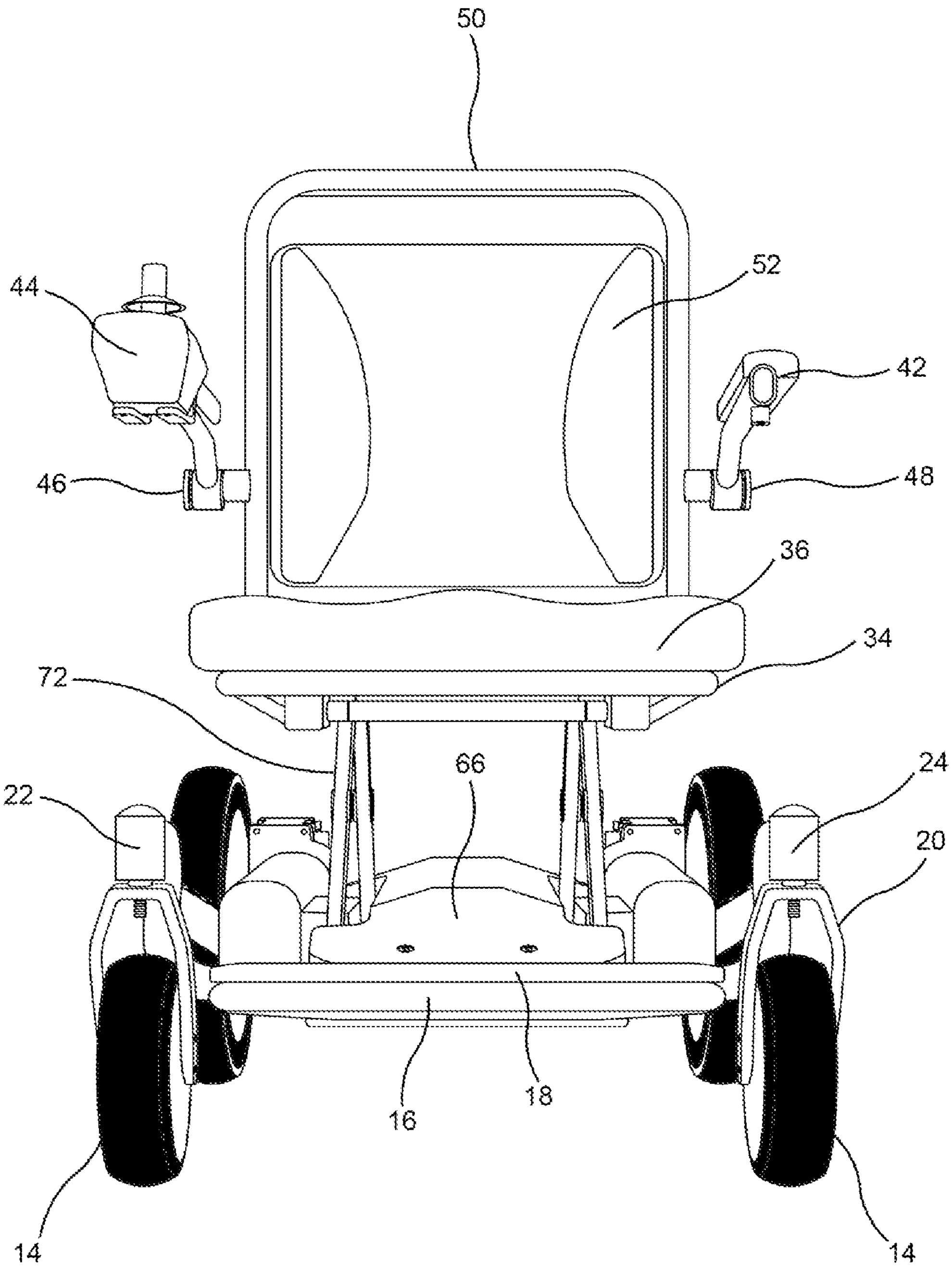
FIG. 4 shows the front view of the folding electric wheelchair with elevating seat and schematically illustrates the wheelchair in the unfolded operational drive position.

Referring now to FIG. 4 (front unfolded view) of the folding electric wheelchair with elevating seat. The user of the embodiment sits on 36 and 52. The upper seating area for the user on the embodiment consists of 52 which is attached to the three crossbeams that are welded to 50. The contour of 52 is ergonomic to follow the curvature of the human spine. The specific embodiment of 52 is made out of a breathable, flexible and washable material.

The lower seating area 36 is ergonomically contoured which provides comfortable seating for the user. The front edge of 36 curves downward towards the ground and away from the backside of the user's legs. This specific embodiment of 36 does not dig into the back of the user's legs which can cause pain, stiffness or circulation problems as prior art. The specific embodiment of 36 is made out of a breathable and washable material. The base of 36 is a solid material and is bolted onto 34 by four screws into the two crossbeams supports of 34. The inside of 36 is made of foam which connects to the solid, ergonomic contoured base of 34.

The legs of the user are placed on 16. The top portion of 16 holds 18 which is strapped onto 16 using three connection straps that wrap around the round tube frame shape of 16. These three connection straps are then screwed into 18 to secure it in place. To assist the user with extra leg support 72 is a specific embodiment that can stay on or be easily removed from the folding electric wheelchair with elevating seat. The design of 72 attaches to the bottom side of the embodiment by 34 and is secured to the base of 66.

Figure 5:
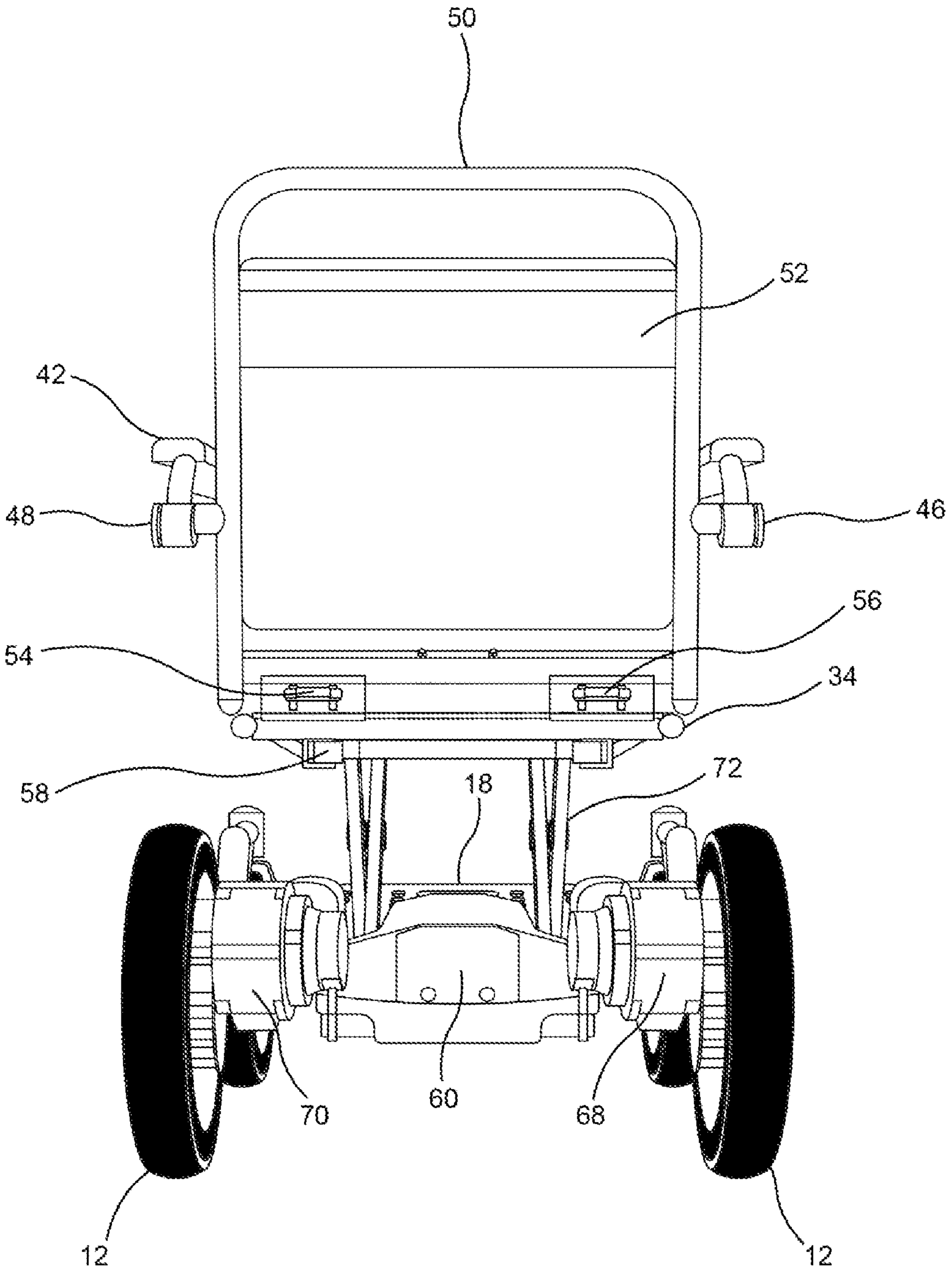
FIG. 5 shows the back view of the folding electric wheelchair with elevating seat and schematically illustrates the wheelchair in the unfolded operational drive position.

Referring now to FIG. 5 (back unfolded view) of the folding electric wheelchair with elevating seat. When the embodiment is in the unfolded and locked position 54 and 56 prevent it from folding up while the user is sitting in the wheelchair, 54 and 56 connect to 34 to lock the frame in this unfolded position. The top portion of 54 and 56 are welded onto the bottom crossbeam of 50. The bottom portion of 54 and 56 are welded onto of 34.

To move the folding electric wheelchair with elevating seat, the embodiment has two motors. The first specific embodiment is 68. The second specific embodiment is 70. Both 68 and 70 are sealed inside a weatherproof metal housing, with brushless electronic internal drive components and can vary in wattage depending on the desired speed and weight capacity of the user. Both 68 and 70 have electromagnetic brakes, to assist the user in stopping or slowing down. Each specific embodiment of 68 and 70 has a manual drive function, so the user can be pushed. No power is needed to roll the embodiment in manual mode.

Figure 6:
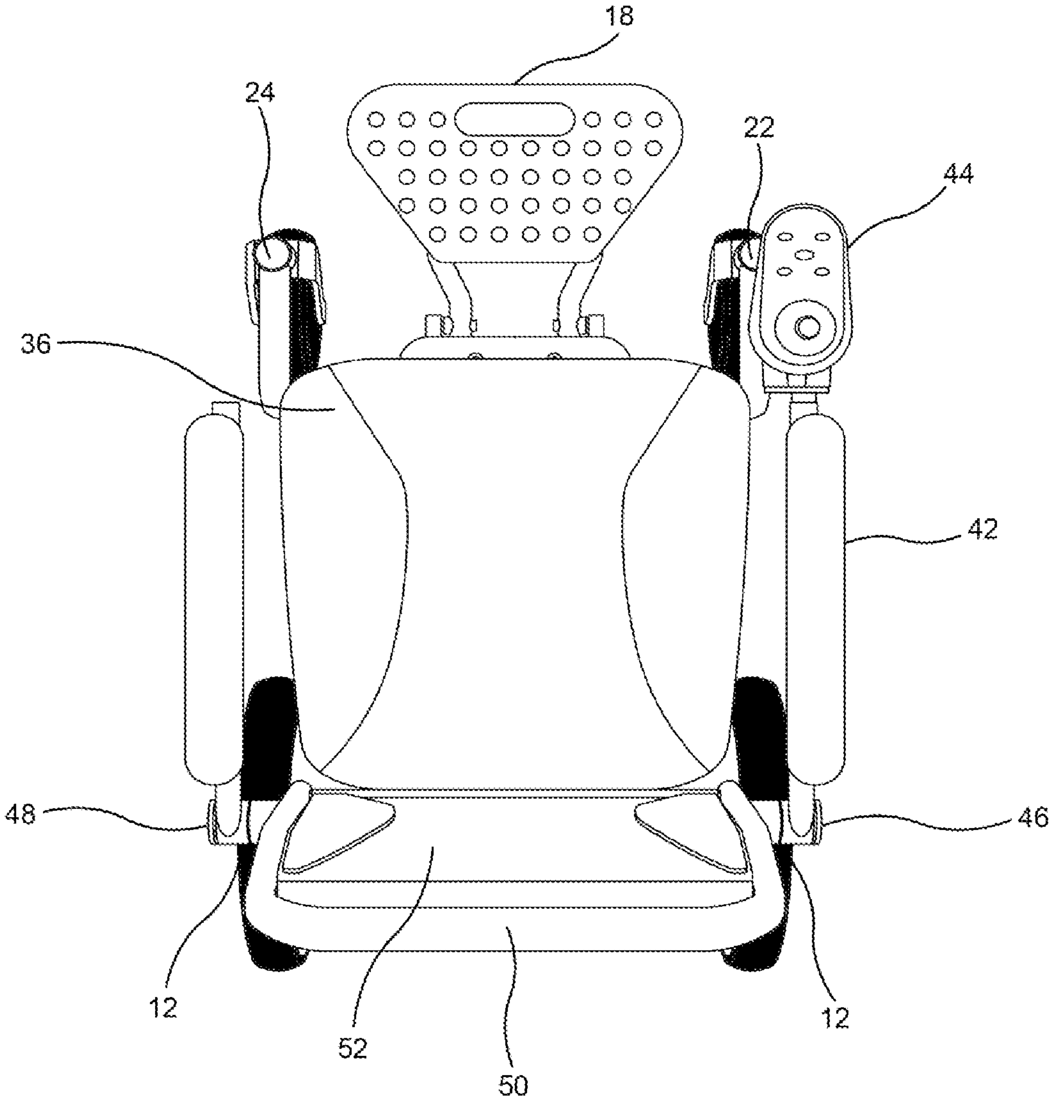
FIG. 6 shows the top view of the folding electric wheelchair with elevating seat and schematically illustrates the wheelchair in the unfolded operational drive position.

Referring now to FIG. 6 (top unfolded view) of the folding electric wheelchair with elevating seat. The specific embodiment for steering the folding electric wheelchair with elevating seat while driving is 22 and 24. Both 22 and 24 swivel 360-degrees so the embodiment can drive in any direction the user desires. While 44 controls all the wheels of the embodiment including 12, 22, and 24. This allows the user to have maneuverability in tight spaces and around any obstacles while driving.

While the user is seated position on 36, they place their feet rest on top of 18. This specific embodiment can be made out of different materials that provide traction and grip on the top surface. When driving the embodiment in wet weather 18 helps hold the user's feet securely in place by the circle traction pattern. The circle traction pattern can range in different sizes or pattern shapes, as long as that pattern covers the entire surface of 18.

Figure 7:
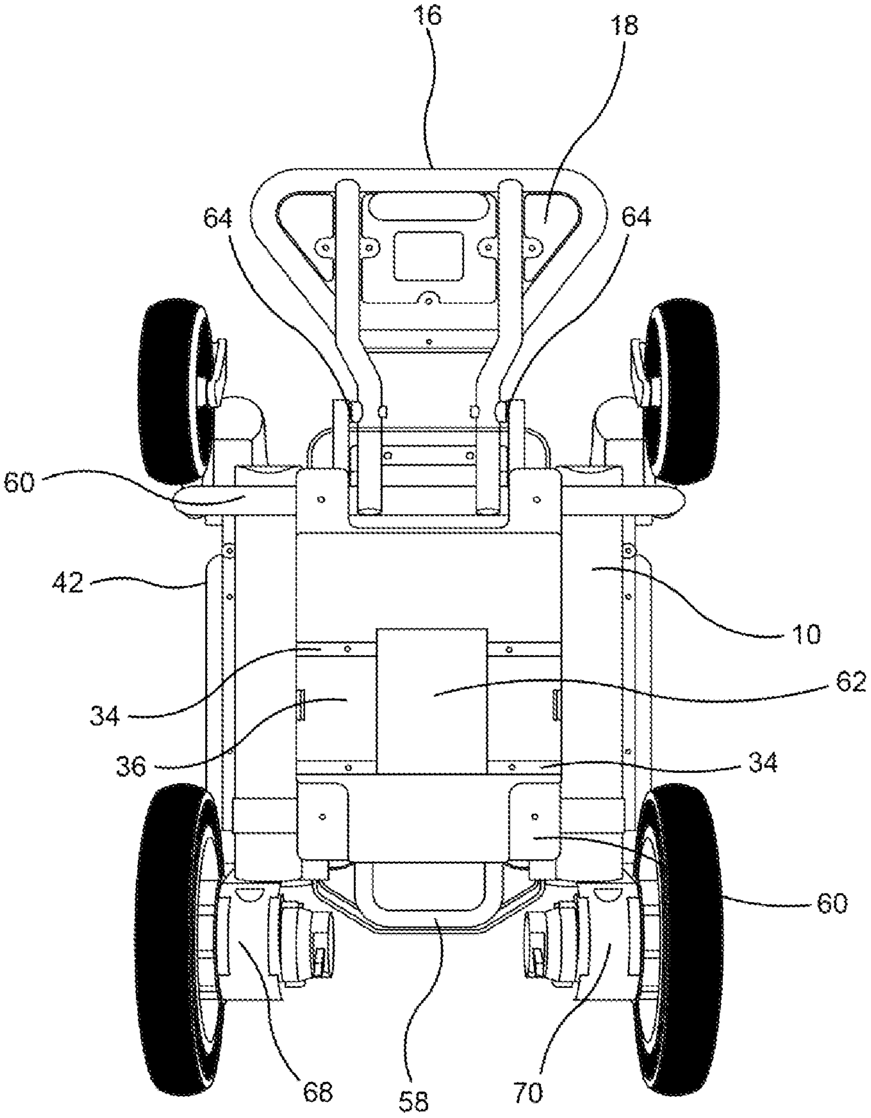
FIG. 7 shows the bottom view of the folding electric wheelchair with elevating seat and schematically illustrates the wheelchair in the unfolded operational drive position.

Referring now to FIG. 7 (bottom unfolded view) of the folding electric wheelchair with elevating seat. This view showcases the undercarriage of the embodiment and the hinge joints that assist in folding up the electric wheelchair. The user of the embodiment sits on 36 which is bolted onto 34 by four screws into the two crossbeam supports of 34. The rear undercarriage joint is 58. This specific embodiment folds the rear portion. The shape of the tube is round and attaches to the left and right sides of 60. A socket shoulder bolt is used in 58 because the bolt has both a smooth and threaded surface area. The smooth half of this bolt allows the specific embodiment to fold and unfold, while the threaded half secures 58 to 60. The front undercarriage joint is 64 located in the front portion of the embodiment. This specific embodiment folds up 16. The shape of the tube is round and attaches to the left and right sides of 60. A socket shoulder bolt is used again in 64 because the bolt has both a smooth and threaded surface area. The smooth half of this bolt allows 16 to fold and unfold, while the threaded half secures 64 to 60.

The main electronic operation for driving the embodiment is handled by 62. This specific embodiment is sealed inside a weatherproof case which is then secured by bolting to 60. The electronic power for 62 is provided by 66 which also provides power for steering all the wheels by 44, which is remotely connected to 68 and 70. The electronic driving system for the embodiment consists of the following sealed weatherproof specific embodiments: 62, 44, 66, 68 and 70.

Figure 8:
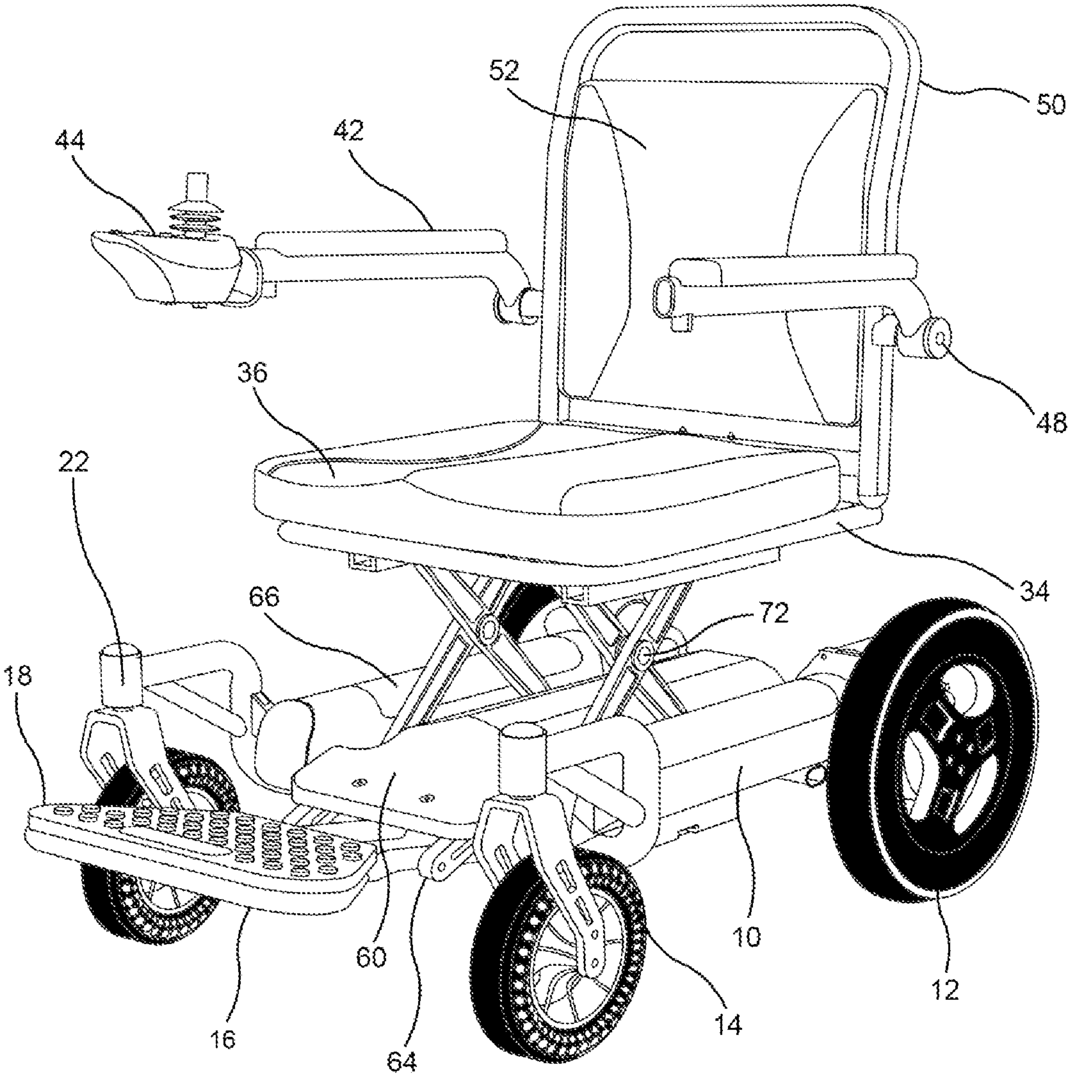
FIG. 8 shows the perspective view of the folding electric wheelchair with elevating seat and schematically illustrates the wheelchair in the unfolded operational drive position.

Referring now to FIG. 8 (perspective unfolded view) of the folding electric wheelchair with elevating seat. While the user is sitting on 36, the user can rest their arm(s) on 42. On the right and left side of the embodiment 42 helps hold the user on 36. The material of 42 can consist of other types of tubular material, and the tube has an oval shape. Having the tubular material be an oval shape provides the bump-dampening and terrain vibration system for the folding electric wheelchair with elevating seat. Whether the user is right-handed or left-handed 42 holds 44, which is used to steer the folding electric wheelchair with elevating seat. The 44 is how the user operates or steers the embodiment. The top knob of 44 can be pushed in any direction providing 360-degrees of maneuverability. There are many different brands of 44 that can be used. The specific embodiment of 44 is sealed to be weatherproof so the user can operate the embodiment in any type of weather. The top knob and control buttons are also sealed from the outside elements. The main operating functions of 44 are: to power on/off the embodiment, speed control, and driving maneuverability.

The embodiment has a total of four wheels: two smaller sized 14 and two larger sized 12. The overall size and dimensions of 12 and 14 can vary. Both 12 and 14 are made of solid rubber so the user can drive over sharp objects without getting a flat tire. The solid rubber wheels also assist in the bump-dampening and terrain vibration system on the embodiment. Both 12 and 14 have an aggressive off-road tire tread to assist the user in driving over many different types of terrain.

Operation of Specific Embodiments

The manner of how the embodiment operates to fold and unfold consists of specific hinge joint embodiments. The manner of how the embodiment operates to fold. First, push up on or raise up 42 which is attached to hinge joints 46 and 48. Move yourself around to the back view of the embodiment (not shown here but shown in FIG. 5) push down on 56 to unlock the unfolded frame pieces. While pushing in 56 simultaneously push forward on 50, both specific embodiments are attached to hinge joint 58. Continue pushing forward on 50 until the embodiment is laying parallel to the ground. The continuing forward motion of 50 will automatically cause the remaining specific hinge joints embodiments to fold up.

The manner of how the embodiment operates to unfold. Keep the embodiment lying flat on the ground (not shown here but shown in FIG. 2). Move yourself around to the back view of the embodiment (not shown here but shown in FIG. 5). The user grabs the top cross bar portion of 50 with one or both hands and pull in an upwards motion towards the rear of the embodiment. Once the embodiment is in the unfolded position 56 will close automatically to lock the specific embodiment pieces in the unfolded position so the user can seat down on 36.

CONCLUSION, RAMIFICATIONS AND SCOPE

Accordingly, the reader will see that several advantages of one or more aspects are as follows: to provide the user an electronic driving system that is sealed to be weatherproof, able to drive over different terrain types and slope grades on any given day whether it's raining or sunny, ergonomically contoured seat with an actuator that can raise and lower the overall height of the seat base, lightweight and portable for transportation, travel-friendly, compact in overall size when in the folded position to fit into a small space for storage. Furthermore, the folding electric wheelchair with elevating seat has additional advantages in that:

- it provides the user a folding electric wheelchair with elevating seat that folds up into a small sized space to fit inside the trunk of a vehicle or automobile.
- it provides the user a folding electric wheelchair with elevating seat to drive in any type of weather conditions.
- it permits the user to plan their future appointments without worrying about rainy days and the electronic drive system getting wet and stop operating as such with such prior art.
- it permits the user a folding electric wheelchair with elevating seat that can keep driving off road and over different terrain types even if the flat concrete sidewalk ends.
- it provides the user a folding electric wheelchair with elevating seat that is travel friendly on airplanes, because the FAA regulations state that lithium-ion batteries must be encased in the equipment. Much like laptops, smartphones, and tablets lithium ion batteries are encased inside those devices.
- it permits the user a folding electric wheelchair with elevating seat to drive up slopes that are steeper than a 12-degree maximum slope as per ADA guidelines for a handicapped ramp. Many real-life driving situations are steeper, for example: parking garages, crosswalks, gangways, streets with hills and sidewalks.
- it provides the user a folding electric wheelchair with elevating seat with a bump dampening and terrain vibration system. When driving over rough terrain the user does not feel every bump in the road. Many disabled users suffer in pain throughout the day, and a small bump in the road may cause additional pain for the user.
- it provides the user a folding electric wheelchair with elevating seat with ergonomically contoured seating cushions. Said ergonomic cushions are contoured to follow the natural curves of the human body. This provides the user additional comfort while seated for extended periods of time.
- it provides the user a folding electric wheelchair with elevating seat with an actuator that allows the seat base to raise and lower in overall height so smaller sized people or a child can adjust the seat height to fit their body size exactly.

Although the description above contains many specificities, these should not be construed as limiting the scope of the embodiment but as merely providing illustrations of independence and freedom the user would gain from said embodiment.

Thus, the scope of the embodiment should be determined by the appended claims and their legal equivalents rather than by the examples given.

The invention claimed is:

1. A folding electric wheelchair with elevating seat comprised of a seat to support the user, a pair of front wheels, a pair of rear motor wheels, a pair of batteries, one joystick controller, one operational drive computer, individual pieces of frame bolted to each other to provide folding hinge joints that collapse the wheelchair into a small space:

a. comprising left side and right side front folding hinge joints;
 i. wherein said folding hinge joints are composed of a tubular material,
 ii. wherein said folding hinge joints with a tubular material have an oval shape,
b. comprising left side and right side armrest folding hinge joints;
 i. wherein said armrest folding hinge joints are composed of a tubular material,
 ii. wherein said armrest folding hinge joints with the tubular material have an oval shape,
c. further includes left side and right side seat base folding hinge joints;
 i. wherein said seat base folding hinge joints are composed of a tubular material,
 ii. wherein said seat base folding hinge joints with the tubular material have an oval shape,
d. comprising a rear frame folding hinge joint;
 i. wherein said rear frame folding hinge joint is composed of a tubular material,
 ii. wherein said rear frame folding hinge joint with the tubular material has an oval shape,
e. comprising a footrest folding hinge joint;
 i. wherein said footrest folding hinge joint is composed of a tubular material.

2. A folding electric wheelchair with elevating seat of claim 1 further comprising a bump dampening and terrain vibration system with supporting frame pieces having an oval shape, and a pair of vibration springs under the seat:

a. wherein said supporting frame pieces are composed of a tubular material;
b. further includes supporting frame pieces of a backrest support frame, a seat base support frame, armrest frames with the tubular material having an oval shape;
c. wherein said pair of front wheels and said pair of rear motor wheels are composed of solid rubber.

3. A folding electric wheelchair with elevating seat of claim 1 further comprising an electronic driving system that is sealed to be weatherproof:

a. wherein said pair of rear motor wheels are composed of an electric 250 wattage brushless motor;
b. wherein said pair of rear motor wheels are composed of an internal rubber gasket lining to prevent outside water elements from damaging the internal brushless motor;
c. wherein said pair of batteries are composed of lithium ion;
 i. wherein said pair of lithium ion batteries slide into and are then encased inside the tubular material of a battery sleeve housing,
 ii. wherein said pair of lithium ion batteries are located on the right and left side of a seat base support frame,
d. wherein said joystick controller is composed of a rubber gasket lining to prevent outside water elements from damaging internal circuit boards.

4. A folding electric wheelchair with elevating seat of claim 1 further comprising ergonomically contoured seating cushions to support the user which are secured to the supporting frame pieces:

a. further including a sculpted seat cushion which is secured to a seat base support frame;
b. further including a backrest cushion which is secured to a backrest support frame;
c. wherein said seat and backrest cushions are composed of a breathable nylon mesh outer material.

5. A folding electric wheelchair with elevating seat of claim 1 further comprising an all terrain drive system, solid rubber tires with an aggressive tread pattern, means to drive over different terrain types, means for driving up to a 25 degree slope:

a. further includes a pair of 250 wattage brushless electric motor wheels;
 i. wherein said pair of rear motor wheels are located behind a backrest support frame which is behind the backside of the user when seated,
b. wherein a wheelbase positions the user on a seat base support frame in the center of the wheelbase to obtain a hill climb ability of up to 25 degrees;
c. wherein said pair of front wheels and said pair of rear motor wheels have an overall wheel width of at least 2 inches.

6. A folding electric wheelchair with elevating seat of claim 1 with an actuator that allows a seat base support frame to raise and lower in overall seat height so smaller sized people or a child can adjust the seat height to fit their body size exactly:

a. wherein said actuator can raise and lower the seat base support frame with an adjustable max height range of no more than 19 inches from the ground to the top of a seat cushion;
b. wherein said actuator can raise and lower the seat base support frame with an adjustable lower height range of no more than 4 inches from the ground to the top of the seat cushion;
c. wherein said actuator can stop and lock into any seat base support frame height position from 4 to 19 inches from the ground.

* * * * *